L. BEMELMANS.
Process and Apparatus for Washing Common Salt.

No. 212,649. Patented Feb. 25, 1879.

WITNESSES:
W. W. Hollingworth
Edw. W. Byrn

INVENTOR:
L. Bemelmans
BY
ATTORNEYS.

UNITED STATES PATENT OFFICE.

LEON BEMELMANS, OF KANAWHA COURT-HOUSE, WEST VIRGINIA.

IMPROVEMENT IN PROCESSES AND APPARATUS FOR WASHING COMMON SALT.

Specification forming part of Letters Patent No. 212,649, dated February 25, 1879; application filed November 30, 1878.

*To all whom it may concern:*

Be it known that I, LEON BEMELMANS, of Kanawha Court-House, in the county of Kanawha and State of West Virginia, have invented a new and Improved Process and Apparatus for Washing Common Salt; and I do hereby declare that the following is a full, clear, and exact description of the same, reference being had to the accompanying drawings, forming part of this specification, in which—

Figure 1:
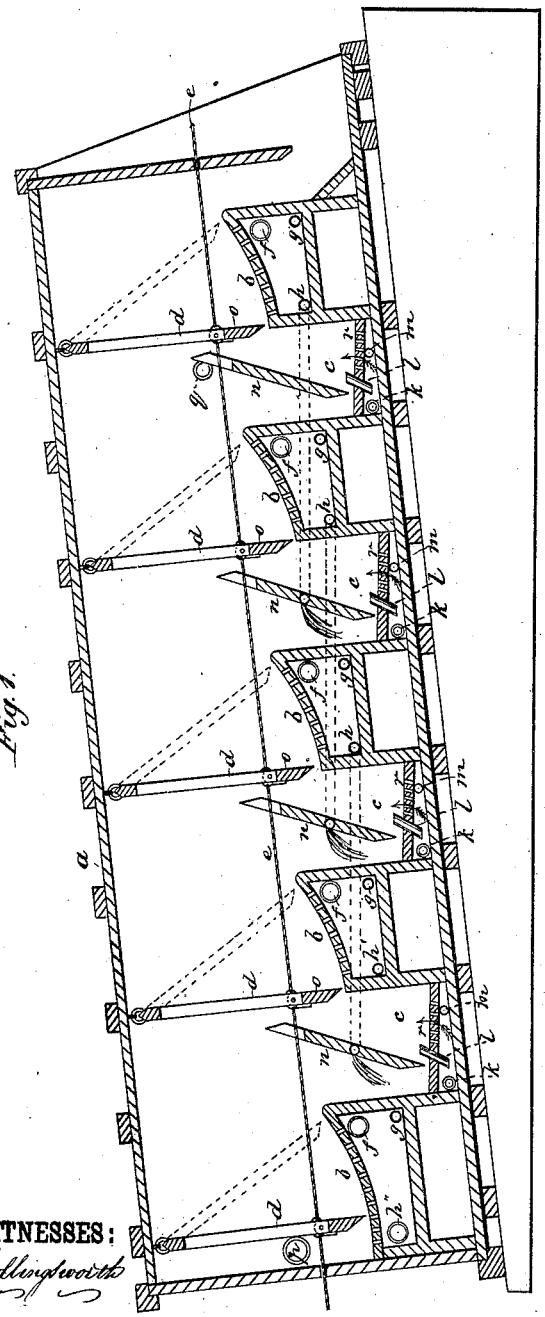
Figure 2:
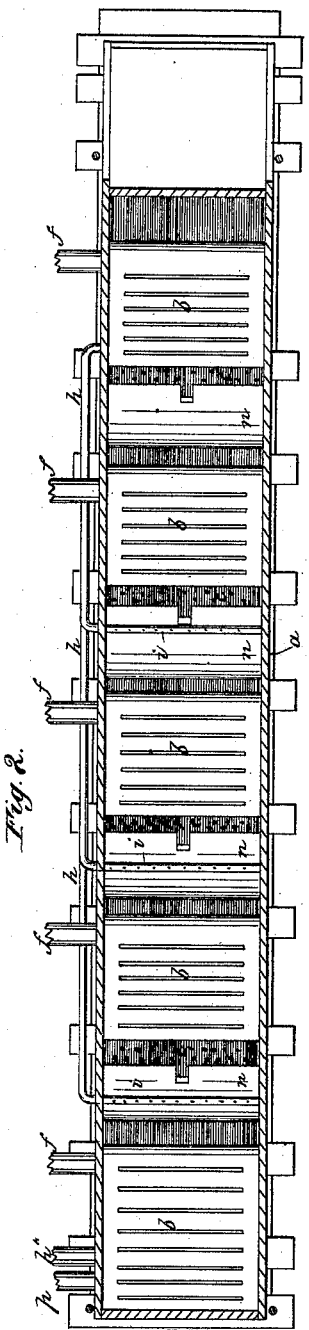

Figure 1 represents a longitudinal vertical section of the device. Fig. 2 is a horizontal section through the line $e\ e$.

The invention is designed to be applied more particularly to the washing of salt in the manufacture or separation of the same from its solution. The object is to separate the bittern and all soluble compounds from the salt, so as to obtain the same pure, although mixed with more or less water.

$a$ is a steam-chest of wood, from three to six feet wide, seven to ten feet high, and of any suitable length. In the steam-chest $a$ are disposed five or more transverse arc-shaped filtering-stands, $b\ b\ b$, alternating with double-bottomed tanks $c\ c\ c$.

The filtering-stands $b\ b\ b$ are covered with unbleached cotton. They are made in the shape of perforated or slitted arched tables or stands, so as to be swept by sweeps $d\ d\ d$, each of which hangs from a wooden cross-bar inside the steam-chest, and is moved to and fro by means of a rope, $e\ e$, from outside the steam-chest.

In the chamber under each filter are three apertures. The largest, $f$, communicates with a condenser terminated by an air-exhauster. The second set are shown at $g\ g\ g$, by which water is introduced in the box when necessary to dissolve any obstruction of crystallized compounds. The last, $h\ h\ h$, receive the solutions which pass through the filters and convey them by the outstanding pipe (shown in dotted lines of Fig. 1) to the transverse pipes $i\ i\ i$.

The pipe $h'$, at the last filter but one to the left, carries the liquid out of the apparatus, while the pipe $h''$, under the last filter, receives the bittern or impurities and conveys them out of the steam-chest.

In each tank the false bottom $r$ is perforated with conical and minute holes on the three quarters of its surface situated on the right of partition $n$.

Communicating with the space under the false bottom are three apertures, of which $k\ k\ k$ bring in steam, which is dry, but not superheated, and under a pressure of a few pounds to the square inch.

The apertures $l\ l\ l$ are fitted each with a piece of pipe dipping below and projecting through the false bottom. These pipes purge by a well-known process the space under the false bottom from any solution which may accumulate in it, the steam-pressure on the surface of the liquid forcing the latter up the pipes.

The apertures $m\ m\ m$ are used for introducing water under the false bottom when necessary, in order to dissolve any obstruction.

In each tank above the false bottom is an inclined transverse partition, $n\ n\ n$, through which extend the transverse pipes $i\ i\ i$, opening through perforations upon the left-hand side of the partition into the tank.

The sweeps $d\ d\ d$ have their sweep-boards $o\ o\ o$ on hinges, so that these boards can rise over the salt on their return trip.

The mixture of salt and bittern is introduced over the first filtering-stand $b$ on the left, through aperture $p$ in the side of the steam-chest, while a solution of pure salt is introduced at $q$ on the right.

In the case of salt-washing the whole apparatus is made of wood. The steam-chest is inclined, in order to produce the motion of liquids.

The operation of the washer is as follows: The salt with the liquid which soils it is introduced at $p$, and falls on the first filter on the left. The liquid is partially extracted by means of the vacuum under the filter produced through opening $f$. This liquid escapes at $h''$. The salt is pushed by the sweep into the left partition of the first tank, and is carried down by the solutions, escaping from the perforated pipe $i$, no steam escaping through the false bottom under that part of the tank; but as the salt passes over that part of the false bottom which is perforated the steam catches it and stirs it energetically in the liquid which fills the tank, and ultimately throws it on the second filter $b$. The same operation is repeated at each set of filter and tank. On the other hand, a saturated solution of pure salt is introduced at *q*, runs on the left side of the partition *n*, and helps the salt to go down. It washes the salt in the right part of the tank, rises and passes down the perforations of the right-hand filter, entering the chamber beneath, whence it passes out at *h* through the outstanding pipe, and, dropping down through the pipe *i*, repeats its action in the second filter upon the salt, and so on through all the tanks to the first on the left, the brine traveling to the left, while the salt travels to the right.

The result of this systematic treatment is that the salt pushed from the last filter on the right is pure, while the brine, escaping at *h'*, contains much bittern, and consequently but little salt.

Instead of using a double bottom to the tank *c*, a perforated steam worm or pipe may be located therein.

In defining the state of the art to which my invention pertains, I would say that I am aware that it is not new to wash out the impurities of salt by showering a solution of salt upon the same when sustained upon a perforated diaphragm or partition, and that the liquid has been extracted from the salt as sustained upon this diaphragm by a suction of air through the same from below, and I do not claim such operations, broadly.

Having thus described my invention, what I claim is—

1. The process of cleansing salt from bittern and other impurities, which consists in alternately agitating the salt in a solution of salt by means of steam-jets, and separating upon a filter the liquid from the crystals by exhausting the air from beneath the filters, substantially as described.

2. The steam-washing tanks *c*, the alternating filters *b*, having perforated arc-shaped surfaces and an exhausting communication beneath, the oscillating sweeps *d*, the partitions *n*, and the pipes *h*, communicating with the chamber beneath one filter and opening at its other end into the second tank *c* beyond, all combined as shown and described.

3. The combination of the arc-shaped filter *b*, the alternating agitating-tanks *c*, and the sweeps *d*, substantially as described.

LEON BEMELMANS.

Witnesses:
JAMES E. MIDDLETON,
RICHARD HARTE.